Dec. 18, 1962     E. C. THOMSON     3,069,552
TIMING CIRCUIT
Filed March 7, 1961
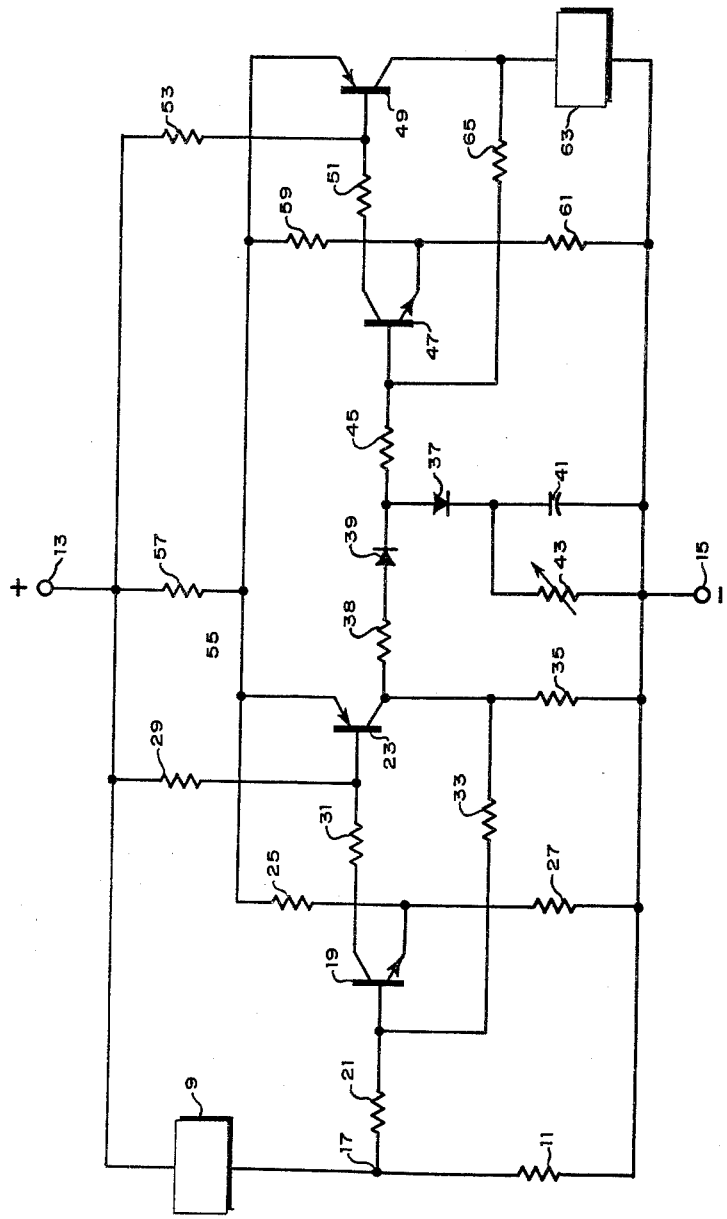
INVENTOR
E.C. THOMSON
BY J. C. Chognan
ATTORNEY United States Patent Office 3,069,552
Patented Dec. 18, 1962

1

3,069,552
TIMING CIRCUIT
Elihu Craig Thomson, Wellesley, Mass., assignor to Electronics Corporation of America, Cambridge, Mass., a corporation of Massachusetts
Filed Mar. 7, 1961, Ser. No. 94,064
11 Claims. (Cl. 250—214)

This invention relates to timing circuits and, more particularly, to an improved transistor timing circuit which provides an accurate timing interval that is independent of the transistor parameters and load conditions.

Conventional multivibrator circuits are frequently used as timing circuits in pulse generators or logic operations. In these applications, the load usually does not vary during the timing interval. It is difficult, however, to achieve high timing accuracy using multivibrator circuits under varying load conditions, since the timing interval thus produced may depend in part upon the external load. In addition, the timing interval may be affected by changes in the transistor parameters. When high timing accuracy is essential in applications involving varying load conditions, it is desirable to reduce the effect of the load circuit upon the timing interval. High timing accuracy may be obtained, then, by isolating the time-determining elements from the load circuit during the entire timing interval. A circuit which operates in this manner can provide accurate time intervals which remain substantially independent of varying load conditions.

It is therefore an object of the present invention to provide a timing circuit which produces a time interval that is substantially independent of load conditions.

It is another object of the present invention to provide a timing network which uses time-determining elements and which remains isolated from associated circuitry during the timing interval.

In accordance with a preferred embodiment of the present invention, a resistance-capacitance timing circuit is charged to a predetermined voltage by a transistor regenerative amplifier which is actuated by an input signal. A utilization circuit is energized through a second regenerative amplifier which is triggered by the output signal of the first regenerative amplifier. A pair of serially connected diodes serve to charge a timing circuit from the output of the first regenerative amplifier. These diodes also serve to isolate the timing circuit from the first and second amplifiers when the input signal is subsequently removed. The utilization circuit remains energized for a predetermined timing interval subsequent to the removal of the input signal. This timing interval is determined by the time required for the voltage across the isolated timing circuit to decay to a predetermined value. At the end of the timing interval, the second regenerative amplifier is reconnected to the timing circuit and the utilization circuit is thereby de-energized.

Other and incidental objects of the present invention will be apparent from a reading of this specification and an inspection of the accompanying drawing which shows a schematic diagram of a circuit in accordance with the present invention.

Referring now to the drawing, a transducer such as photoconductive element 9 and resistor 11 are serially connected between the output terminals 13 and 15 of a direct current power supply. Element 9 may also be a pressure-sensitive switch, or other transducer. The common terminal 17 of serially connected photoconductive element 9 and resistor 11 is connected to the base of transistor 19 through resistor 21. The emitter of transistor 19 is connected to the emitter of transistor 23 through resistor 25 and is connected to terminal 15 of the power supply through resistor 27. The base of transistor 23 is connected to terminal 13 of the power supply

2 through resistor 29, and is connected to the collector of transistor 19 through resistor 31. The collector of transistor 23 is connected to the base of transistor 19 through resistor 33, and is connected to output terminal 15 of the power supply through resistor 35. Resistor 38 and serially connected diodes 37 and 39 connect the collector of transistor 23 through the parallel combination of capacitor 41 and adjustable resistor 43 to the output terminal 15 of the power supply. The common terminal of the serially connected diodes is connected through resistor 45 to the base of transistor 47. The base of transistor 49 is connected to the collector of transistor 47 through resistor 51, and is connected to terminal 13 of the power supply through resistor 53. The emitter of transistor 49 is connected to the emitter of transistor 23 through conductor 55, and is connected to output terminal 13 of the power supply through resistor 57. The emitter of transistor 47 is connected to the common terminal of serially connected resistors 59 and 61, which resistors are connected between the emitter of transistor 49 and output terminal 15 of the power supply. The collector of transistor 49 is connected through utilization circuit 63 to output terminal 15, and is connected through resistor 65 to the base of transistor 47.

In operation, transistors 19 and 23 are cut off when the photoconductive element 9 is dark. Transistors 47 and 49 are also cut off, and utilization circuit 63 remains unenergized. When the photoconductive element 9 changes its conductivity in the presence of light, current begins to flow from output terminal 13 of the power supply through resistor 21 to the base of transistor 19. The increased base current of transistor 19 causes increased collector current to flow through resistors 29 and 31, thereby causing transistor 23 to conduct heavily. The rise in voltage appearing at the collector of transistor 23 causes increased current to flow through resistor 33 to the base of transistor 19. This increased current causes transistors 19 and 23 to conduct more heavily. In this regenerative manner, the current continues to build up continuously until transistor 23 saturates. The collector voltage of transistor 23 subsequently remains at its maximum value.

At the instant when current begins to build up in transistors 19 and 23, current begins to flow through resistor 38 and diode 39 to the input of transistor 47. Current also begins to flow through resistor 38 and diodes 37 and 39 to the timing circuit comprising resistor 43 and capacitor 41. The current through transistors 47 and 49 continues to build up continuously in a manner as previously described for transistors 19 and 23 until transistor 49 saturates. A small resistor 57 is provided in the emitter circuits of transistors 23 and 49 to limit the current flow and to provide bias voltages for the transistors when operating in saturation.

Thus, when photoconductive element 9 is illuminated, the collector voltage of transistor 23 increases to its maximum value. The increased voltage charges the timing circuit comprising capacitor 41 and resistor 43, and triggers the regenerative amplifier comprising transistors 47 and 49. The resulting saturation current through transistor 49 serves to energize the utilization circuit 63. The voltage to which capacitor 41 charges is substantially equal to the voltage appearing between terminal 13 and 15 of the power supply. The circuit remains in this saturated condition during the time that photoconductive element 9 is illuminated.

When photoconductive element 9 is subsequently darkened, the current supplied to the base of transistor 19 through resistor 21 is no longer sufficient to sustain the saturation current in transistor 23. As the current through transistor 23 decreases, the current supplied to the base of transistor 19 through resistor 33 also decreases and further diminishes the amount of base current available to transistor 19. The current through transistors 19 and 23 decreases continuously in this regenerative manner until the current through transistor 23 is substantially zero.

At the instant when the voltage on the collector of transistor 23 decreases to a value slightly less than its maximum value, diodes 37 and 39 cease conducting. The timing circuit comprising capacitor 41 and resistor 43 is thereby isolated from the rest of the circuitry. The current which is supplied to the base of transistor 47 through resistor 65 is sufficient to maintain transistor 49 in the saturated condition.

The utilization circuit 63 remains energized after the photoconductive element 9 is darkened for the time required for the voltage across capacitor 41 to decay to a value that is substantially equal to the voltage at the base of transistor 47. This voltage is determined by the voltage divider comprising resistors 59 and 61. At the instant when the voltage across capacitor 41 is substantially equal to the base voltage of transistor 47, diode 37 becomes forward biased. The diode 37 then serves to conduct a portion of the current in resistor 65 through resistors 43 and 45 to power supply terminal 15. The current which thus flows through resistor 45 decreases the amount of base current available for transistor 47 to a value that is insufficient to sustain the saturation current of transistor 49. As the current through transistor 49 decreases, the base current available to transistor 47 decreases, further reducing the current through transistor 47. The current through transistor 49 decreases continuously in this regenerative manner to zero, thereby de-energizing utilization circuit 63. The length of time that utilization circuit 63 remains energized after the photoconductive element 9 is darkened is thus determined by the time constant of resistor 43 and capacitor 41.

The utilization circuit 63 may also be operated in the normally energized state in the absence of ambient light on photoconductive element 9. This is accomplished by interchanging the positions of element 9 and resistor 11. The utilization circuit 63 then becomes de-energized after a predetermined timing interval following the application of light to photoconductive element 9.

Therefore, the timing circuit of the present invention can be arranged to provide an accurate timing interval subsequent to either the illumination or the darkening of the photoconductive element. Since the time delay circuit, including the resistor and capacitor, remains isolated during the critical operating time, the resulting timing interval is not affected by transistor parameters or load circuit variations. In addition, the regenerative amplifier which serves to control the utilization circuit 63 is connected to be voltage-responsive, and thus the resulting timing interval is independent of the current gain of the sensing transistor.

I claim:

1. A timing circuit comprising first and second amplifiers, a transducer for detecting the presence of a selected physical event, means including the transducer and responsive to the presence of the physical event to produce a signal at the output of the first amplifier, a first circuit means including a storage element and a resistor connected to provide a predetermined time constant, a utilization circuit, means including the second amplifier to energize said utilization circuit in response to signals applied thereto, second circuit means to apply the signal appearing at the output of the first amplifier to the first circuit means and to the second amplifier, means including the second circuit means to disconnect the first circuit means from the first and second amplifiers when the physical event is subsequently removed, the second amplifier being adapted to maintain the utilization circuit in the energized state subsequent to the removal of the physical event, the second circuit means being adapted to reconnect the first circuit means to the input of the second amplifier after a time subsequent to the removal of the physical event and related to said time constant, the second amplifier being adapted to de-energize the utilization circuit when the first circuit means is reconnected to the input of said second amplifier.

2. A timing circuit comprising first and second amplifiers, a photoconductive element, means including the photoconductive element and responsive to the presence of light to produce a signal at the output of the first amplifier, timing circuit means including a storage element and a resistor connected to provide a predetermined time constant, a utilization circuit, means including the second amplifier to energize the utilization circuit in response to signals applied thereto, first and second unidirectional conduction elements to apply the signal appearing at the output of the first amplifier to the timing circuit means, said first unidirectional conduction element to apply the signal appearing at the output of the first amplifier to the second amplifier, said first and second unidirectional conduction element being connected to become non-conductive when the photoconductive element is subsequently darkened, the second amplifier being adapted to maintain the utilization circuit in the energized state subsequent to the darkening of the photoconductive element, said second unidirectional conduction element becoming conductive after a time subsequent to the darkening of the photoconductive element that is related to the time constant, and said second amplifier being adaped to de-energize the utilization circuit when the second unidirectional conduction element becomes conductive.

3. A timing circuit comprising first and second amplifiers, a photoconductive element, means including the photoconductive element and responsive to the removal of light therefrom to produce a signal at the output of the first amplifier, timing circuit means including a storage element and a resistor connected to provide a predetermined time constant, a utilization circuit, means including the second amplifier to energize the utilization circuit in response to signals applied thereto, first and second unidirectional conduction elements to apply the signal appearing at the output of the first amplifier to the timing circuit means, said first unidirectional conduction element to apply the signal appearing at the output of the first amplifier to the second amplifier, said first and second unidirectional conduction elements being connected to become nonconductive when the photoconductive element is subsequently illuminated, the second amplifier being adapted to maintain the utilization circuit in the energized state subsequent to the illumination of the photoconductive element, said second unidirectional conduction element becoming conductive after a time subsequent to the illumination of the photoconductive element that is related to said time constant, and said second amplifier being adapted to de-energize the utilization circuit when the second unidirectional conduction element becomes conductive.

4. A circuit according to claim 2 wherein the first and second unilateral conduction elements are semiconductor diodes.

5. A timing circuit comprising first and second regenerative amplifiers, a photoconductive element, means including the photoconductive element and responsive to the presence of light to produce a signal at the output of the first regenerative amplifier, a timing circuit including a capacitor and resistor connected to provide a predetermined time constant, a utilization circuit, means including the second regenerative amplifier to energize said utilization circuit in response to signals applied thereto, means including serially connected first and second diodes to apply the signal appearing at the output of the first regenerative amplifier to the timing circuit, means including the first diode to apply the signal appearing at the ouput of the first regenerative amplifier to the second regenerative amplifier, the first and second diodes being connected to become back-biased when the photoconductive element is subsequently darkened, said second regenerative amplifier being adapted to maintain the utilization circuit in the energized state subsequent to the darkening of the photoconductive element, the second diode being connected to become forward biased after a time subsequent to the darkening of the photoconductive element that is related to said time constant, and said second regenerative amplifier being adapted to de-energize the utilization circuit when the second diode becomes forward-biased.

6. A timing circuit comprising first and second regenerative amplifiers, a photoconductive element, means including the photoconductive element and responsive to the presence of light to produce a signal at the output of the first regenerative amplifier, a capacitor and a resistor connected in shunt therewith to provide a predetermined time constant, a utilization circuit, means including the second regenerative amplifier to energize said utilization circuit in response to signals applied to the input thereof, serially connected first and second diodes to apply the signal appearing at the output of the first regenerative amplifier to the capacitor, means including the first diode to apply the signal appearing at the output of the first regenerative amplifier to the input of the second regenerative amplifier, said second diode being connected to disconnect the capacitor and the resistor connected in shunt therewith from the first and second regenerative amplifiers when the photoconductive element is subsequently darkened, said second regenerative amplifier having a predetermined voltage at the input thereof and being adapted to maintain the utilization circuit in the energized state subsequent to the darkening of the photoconductive element, the second diode being adapted to reconnect the capacitor to the input of the second regenerative amplifier when the signal applied to the capacitor decays to a value that is substantially equal to said predetermined voltage, the second regenerative amplifier being adapted to de-energize the utilization circuit when the capacitor is reconnected to the input of the second regenerative amplifier.

7. A timing circuit comprising first and third transistors of one conductivity type having base, emitter and collector electrodes, second and fourth transistors of opposite conductivity type having base, emitter and collector electrodes, a first amplifier including the first and second transistors and having a positive feedback path connecting the collector electrode of the second transistor and the base electrode of the first transistor, means including a photoconductive element and responsive to the presence of light to apply an input signal to the base electrode of the first transistor, said first amplifier being adapted to operate in the current-saturated condition subsequent to the application of the input signal, a storage capacitor and an adjustable resistor connected in shunt therewith, serially connected first and second diodes and current-limiting resistor connected between the collector electrode of the second transistor and the storage capacitor, said first and second diodes being connected to conduct current when the first amplifier is saturated, a second amplifier including the third and fourth transistors and having a positive feedback path connected between the collector electrode of the fourth transistor and the base electrode of the third transistor, a utilization circuit connected to the collector electrode of the fourth transistor, the second amplifier being adapted to operate in the current-saturated condition and to energize the utilization circuit subsequent to the application of a signal to the base electrode of the third transistor, the current supplied to the input of the second amplifier by the positive feedback path being sufficient to sustain saturation thereof subsequent to the removal of the signal applied to the input thereof, a voltage divider to determine the voltage at the input of the second amplifier during saturation thereof, means including the first diode and limiting resistor connecting the collector electrode of the second transistor and the base electrode of the third transistor, said first and second diodes being connected to become back-biased when the signal applied to the input of the first amplifier is subsequently removed, the second diode being connected to become forward-biased when the voltage applied to the capacitor decays to a value that is substantially equal to the voltage at the input of the second amplifier, said second amplifier being adapted to unsaturate and de-energize the utilization circuit when the second diode becomes forward-biased.

8. A timing circuit according to claim 1 wherein said second circuit means comprise first and second unilateral conduction elements serially connected between the output of said first amplifier and said first circuit means, the input of said second amplifier being connected to a point intermediate said first and second unilateral conduction elements.

9. A timing circuit according to claim 8 wherein said first and second unilateral conduction elements are semiconductor diodes.

10. A timing circuit according to claim 1 wherein said first and second amplifiers are regenerative amplifiers.

11. A circuit according to claim 3 wherein the first and second unilateral conduction elements are semiconductor diodes.

References Cited in the file of this patent

UNITED STATES PATENTS

| | | |
|---|---|---|
| 2,111,386 | Buchmann et al. | Mar. 15, 1938 |
| 3,007,060 | Guenther | Oct. 31, 1961 |